United States Patent [19]

Sheoran et al.

[11] Patent Number: 5,265,408
[45] Date of Patent: Nov. 30, 1993

[54] EXHAUST EDUCTOR COOLING SYSTEM

[75] Inventors: Yogendra Y. Sheoran, Scottsdale; Marc Schmittenberg, Phoenix; Craig A. Lyon, Mesa; Charles M. Royalty, Tempe; Kurt T. Kenzler, Chandler; Thomas W. Davis, Tempe, all of Ariz.

[73] Assignee: Allied-Signal Inc., Morris Township, Morris County, N.J.

[21] Appl. No.: 835,633

[22] Filed: Feb. 13, 1992

[51] Int. Cl.⁵ .............................................. F02G 3/00
[52] U.S. Cl. ................................. 60/39.02; 60/39.08; 60/262
[58] Field of Search ................. 60/39.02, 39.08, 39.15, 60/262, 269, 271

[56] References Cited

U.S. PATENT DOCUMENTS

| | | | |
|---|---|---|---|
| 3,196,608 | 7/1965 | Tindale | 60/262 |
| 3,696,617 | 10/1972 | Ellis | 60/262 |
| 3,710,890 | 1/1973 | True et al. | 181/33 HC |
| 3,812,672 | 5/1974 | Escher | 60/269 |
| 3,841,091 | 10/1974 | Sargisson et al. | 60/271 |
| 3,881,315 | 5/1975 | Hess et al. | 60/271 |
| 4,128,769 | 12/1978 | Bons et al. | |
| 4,487,017 | 12/1984 | Rodgers | 60/262 |
| 4,546,605 | 10/1985 | Mortimer et al. | 60/39.08 |
| 4,773,212 | 9/1988 | Griffin et al. | 60/39.08 |
| 4,909,346 | 3/1990 | Torkelson | 60/262 |

FOREIGN PATENT DOCUMENTS 723406 2/1955 United Kingdom.
2044359 10/1980 United Kingdom.

OTHER PUBLICATIONS

"Airborne Auxiliary Power Units", By F. A. Tomkins and Garrett Turbine Engine Company Engineering Staff, 1974, 1983; pp. 3-5 thru 3-9 6-1 thru 6-6, 9-8 thru 9-9 and Apendix A.

Primary Examiner—Richard A. Bertsch
Assistant Examiner—Howard R. Richman
Attorney, Agent, or Firm—Jerry J. Holden; James W. McFarland

[57] ABSTRACT

A method and apparatus for cooling the heat generated by a gas turbine engine mounted in a compartment is provided. The apparatus comprises a novel eductor that incorporates a mixer nozzle to entrain sufficient air flow through the compartment to provide all the necessary cooling. The engine's oil cooler is mounted to the eductor so that the entrained air flow passes through it and cools the engine's oil. The novel eductor also has means for receiving a flow of high velocity air from the engine and injecting this air downstream of the mixer nozzle to enhance the entraining of the cooling flow.

21 Claims, 5 Drawing Sheets

EXHAUST EDUCTOR COOLING SYSTEM

TECHNICAL FIELD

This invention relates generally to a method and apparatus for cooling the heat generated by a gas turbine engine mounted in a compartment, and in particular to an novel eductor that can entrain sufficient air flow through the compartment to provide all the necessary cooling.

BACKGROUND OF THE INVENTION

In addition to their traditional propulsion functions, gas turbine engines are used as auxiliary power units, (APUs), aboard many types of aircraft, ground vehicles, and stationary installations to provide continuous shaft and/or pneumatic power. The shaft power is used to drive electric generators, hydraulic pumps, or other equipment requiring constant speed operation. The pneumatic power is used for main engine starting, cabin air-conditioning and pressurization, de-icing, air turbine motors, or other components requiring compressed air. When used aboard an aircraft, for example, the APU is typically mounted in a compartment located within the tail cone of the aircraft.

Historically, APU's have only been operated when the aircraft was on the ground. However, recent developments in aircraft design have witnessed the advent of twin engine aircraft capable of long distant, transoceanic flights. Examples of such aircraft are the Boeing 757, 767 and 777, currently under development, as well as the Airbus A300, A310, and A320. A disadvantage to the twin engine design is that when a main engine experiences an inflight shutdown the enormous burden of supplying the aircraft with power falls on the sole, remaining engine. Early on in the development of these aircraft, it was recognized that they would need an additional source of power while inflight. To meet this need it was proposed to start and operate the APU inflight at high altitudes.

During the operation of the APU, heat is rejected into the compartment from numerous sources including the engine skin, exhaust gases, and tailpipe, as well as the engine oil cooler, generator, and other compartment accessories. To prevent the temperature in the compartment from reaching unacceptable levels, a ventilating or cooling airflow must be provided through the compartment.

To remove this heat )an axial, vane type fan, driven off the APU gearbox, is usually provided to pump cooling air past the the oil cooler as well through the compartment. However, because of their multiplicity of high speed, rotating parts, these fans are susceptible to mechanical failures, which when they occur require that the aircraft be removed from operation. Further, these fans sometimes leak oil into the cooling flow which then covers the oil cooler fins resulting in reduced heat transfer and the possibility of an APU automatic shutdown because of excessive oil temperature. Also, as the oil cooler gets covered by this oil the flow of cooling air is blocked, backpressuring the fan and causing it to operate in a rotating stall which results in increased fan noise. Another disadvantage associated with fan cooler is that they increase the drag or load on the engine and therefore make starting the APU at the cold ambient temperatures encountered at high altitudes more difficult.

In addition to fans sometimes a simple eductor having a conic nozzle is added to the cooling system. This eductor utilizes the kinetic energy of the APU exhaust gas to entrain cooling flow through the compartment. Generally, these eductors are not capable of pumping sufficient air flow to cool an oil cooler, and are only used to provide tailpipe or compartment cooling. Further, because of the low air density at altitude, to generate sufficient cooling flow the area of the conic nozzle must be significantly closed down which produces a substantial backpressure of the APU and consequent loss of power. Another disadvantage with these eductors is that when surge bleed flow from the APU's compressor is dumped in the vicinity of the eductor, the eductor's effectiveness is reduced.

Accordingly, there is a need for a novel eductor that can entrain sufficient cooling or venting air flow through the compartment to provide all the necessary cooling including that required by an oil cooler and which can also receive surge bleed flow without reducing effectiveness.

SUMMARY OF THE INVENTION

The object of the present invention is to provide a a APU compartment cooling system that can provide sufficient cooling or venting air flow through the APU compartment to provide all the necessary cooling including that required by an oil cooler, and which can handle surge bleed flow without loss in cooling effectiveness.

Another object of the present invention is to provide an APU compartment cooling system that has no moving parts.

Yet another object of the present invention is to provide an APU compartment cooling system that does not include a cooling fan.

Yet still another object of the present invention is to provide a method for cooling an APU compartment.

The subject invention accomplishes this object by providing a novel eductor that utilizes a mixer nozzle to efficiently transfer the kinetic energy of the engine's exhaust gas to the venting or cooling flow. The eductor also uses the kinetic energy of the surge bleed flow to enhance its eduction capability.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
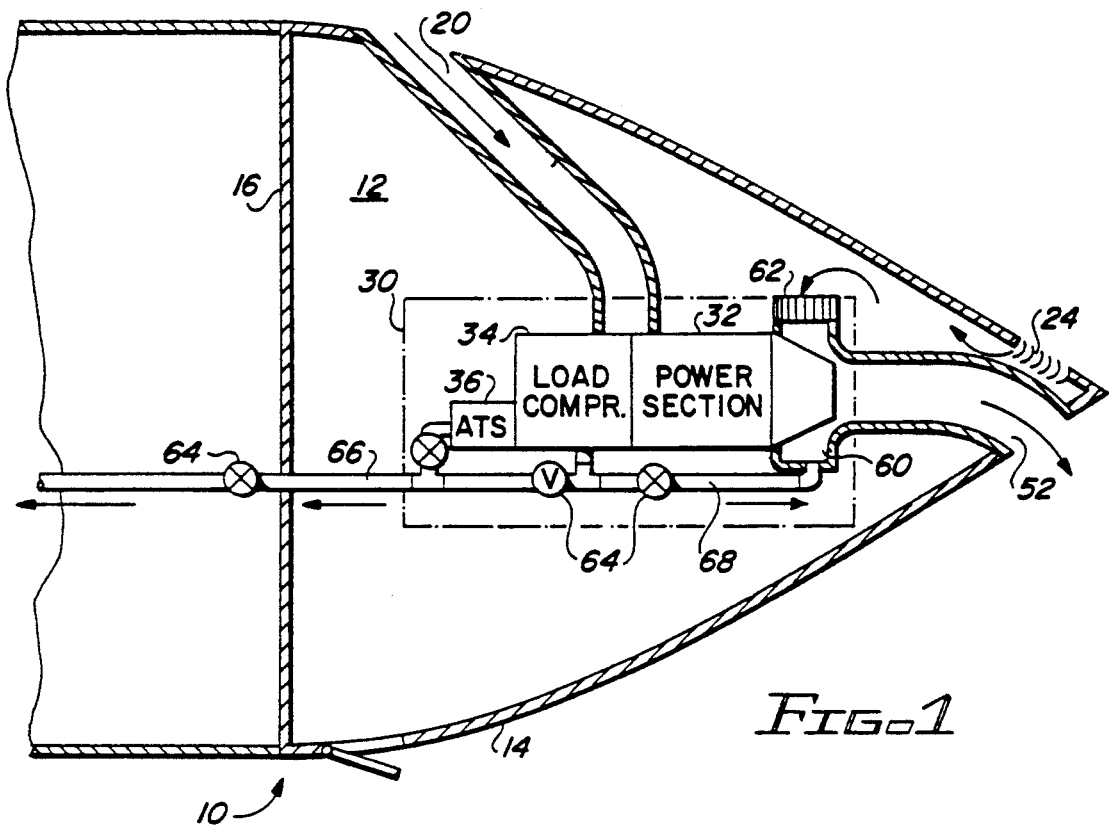
FIG. 1 is a schematic of an aircraft tail cone compartment with an auxiliary power unit mounted therein and having an eductor constructed in accordance with the principles of the present invention.
Figure 5:
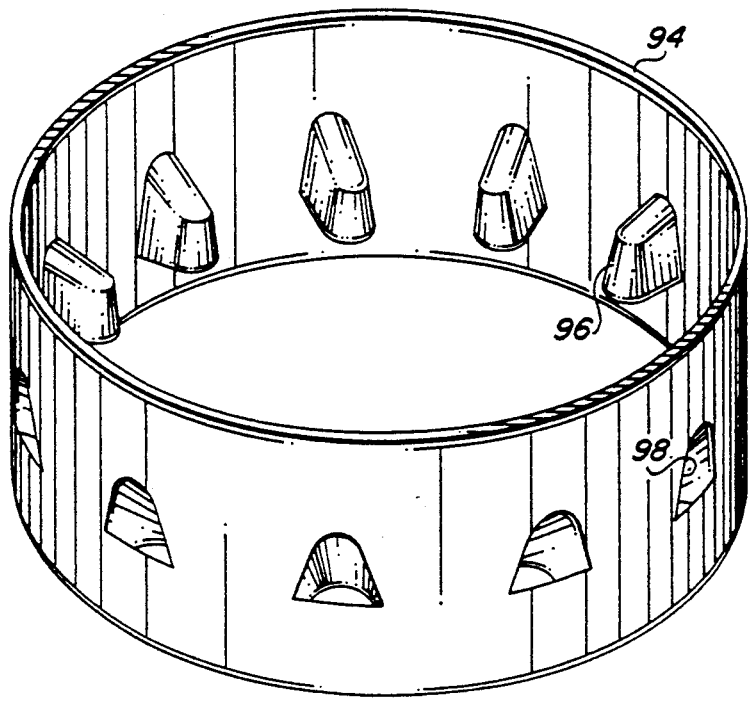
FIG. 5 is a perspective view of a ring wall mounted in the of eductor housing of FIGS. 3 and 4.

FIG. 1 depicts the tail cone 10 of an aircraft having an APU compartment 12. The APU compartment 12 is defined by the aircraft's fuselage skin 14 and a firewall 16. Mounted within the compartment 12 is an auxiliary power, gas turbine engine 30 to which the present invention relates.

The engine or APU 30, highlighted by the dashed box, comprises a power section 32 driving a combined load compressor and gearbox 34 to which an air turbine starter 36 or other accessories, (not shown), such as an electric generator, oil pump, and/or a fuel control unit can be drivingly coupled.

Figure 2:
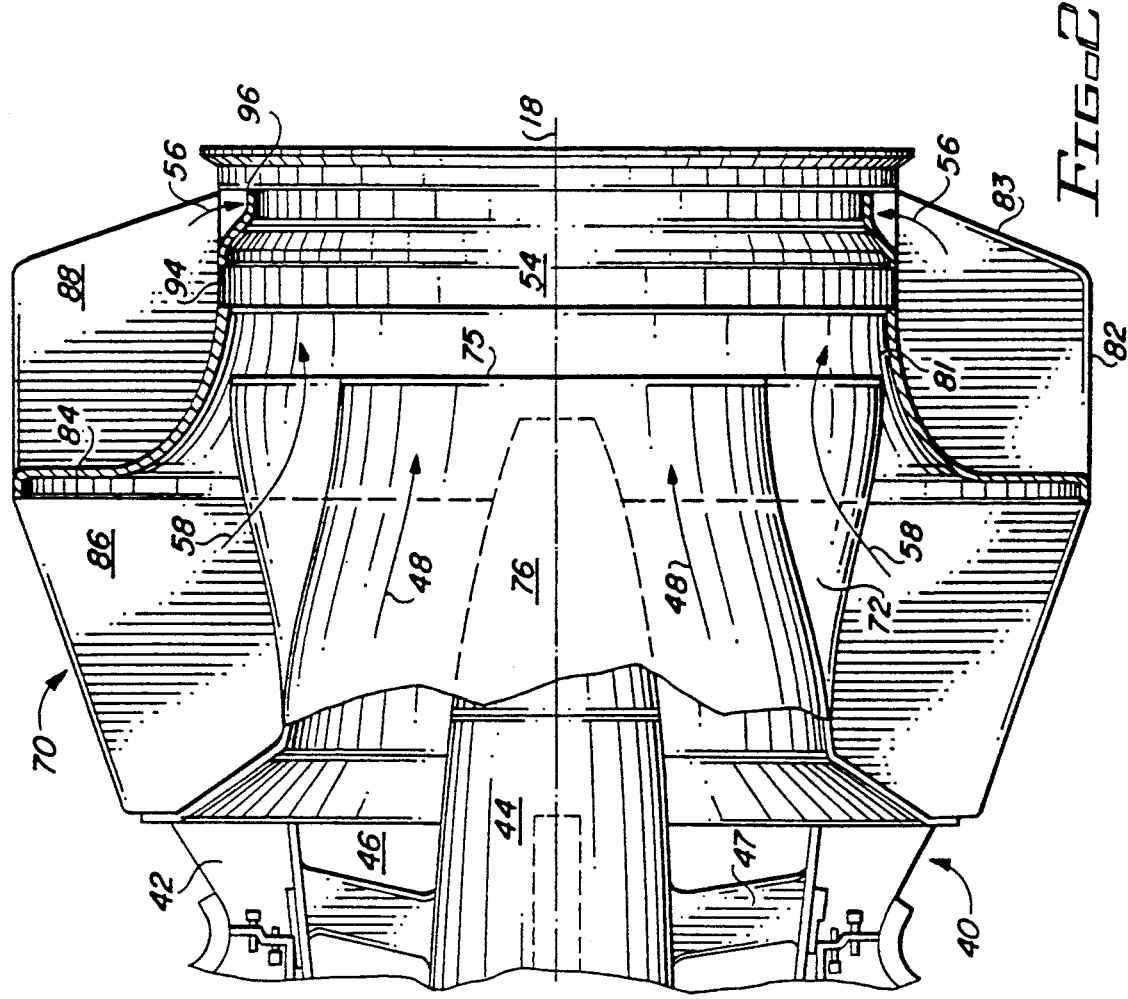
FIG. 2 is a cross-section of the aft portion of the APU in FIG. 1.

The power section 32 is comprised in flow series arrangement of a compressor section, and a combustor section, (not shown) and a turbine section 40, (see FIG. 2). Air is inducted through an intake pipe 20 which opens at one end to ambient and at its other end to the inlets of the power section 32 and load compressor 34. Within the power section 32 the air is compressed and then mixed with fuel and ignited. The resulting hot gas is then expanded through the turbine to drive the compressor, load compressor and gearbox 34. The expanded gas discharges axially from the turbine through an eductor 60, and then through a tail pipe 52 which leads to an opening in the fuselage 14. The eductor 60 receives ambient air through a compartment eductor inlet 24. An oil cooler 62 is mounted across an inlet of the eductor 60. The oil cooler 62 is an oil-to-air heat exchanger of either a tubular or plate fin construction.

The load compressor 34 also inducts air from the intake pipe 20, compresses the air and then feeds compressed air to the aircraft through a first conduit 66. Any compressed air not required by the aircraft flows through a conduit 68 and into the eductor 60. This compressed air is referred to by those skilled in the art as surge bleed flow. A plurality of valves 64 control the distribution of the compressed air from the load compressor between the two conduits 66 and 68.

FIG. 2 shows the aft portion of the turbine section 40. The turbine section 40 comprises an outer annular casing 42 circumscribing a core 44 to define an annular passage 46 through which the expanded hot gas flows as represented by arrows 48. A plurality of stators 47 are disposed between the casing 42 and the core 44.

Figure 6:
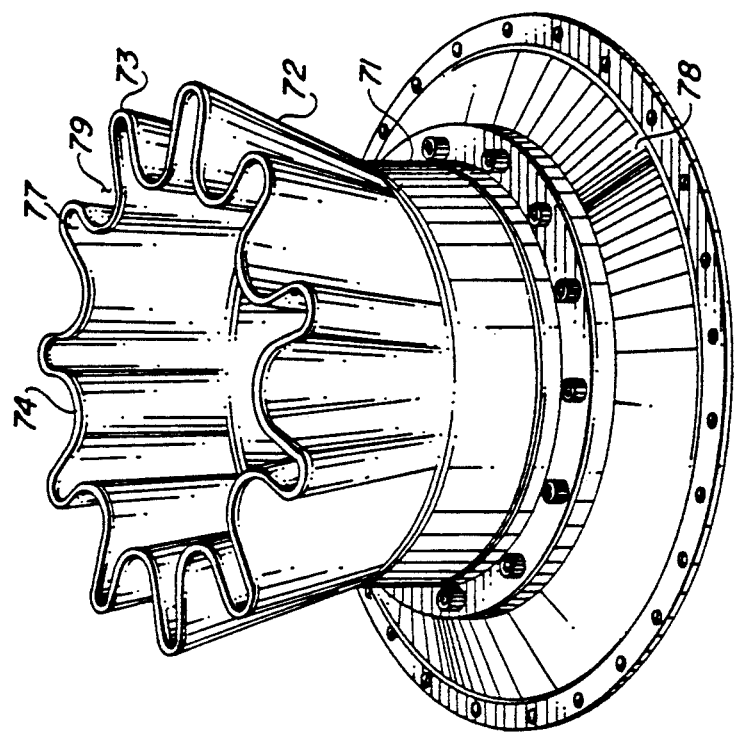
FIG. 6 is a perspective view of a mixer nozzle related to the present invention.

The eductor 60 includes a conventional mixer nozzle 70 coupled to the downstream side of the exhaust section 40. The mixer nozzle includes a lobed mixer 72 having symmetrical inner and outer lobes 73, 74 circumferentially disposed about and radially spaced from a plug 76 to define a plurality of inner passages or channels 77 and alternately spaced outer passages or channels 79. The plug 76 is coupled to the core 44 and extends axially therefrom. The mixer 72 is positioned relative to the exhaust portion 40 so that the inner passages 77 are coaxial with the annular passage 46 so as to receive the hot gas flow 48. As shown in FIGS. 2 and 6, each of the lobes 73, 74 has an increasing radial dimension from the centerline 18 of the engine 30 as it extends axially from one end of a tube portion 71, (see FIG. 6).

Each of the lobes 73, 74 has a radial cutback at its trailing edge 75 so that the air and gas exiting the passages 77 and 79 exits at an angle parallel to the centerline 18 of the APU 30. An annular flange member 78 extends radially from the other end of the tube 71. Lobed mixer nozzles such as nozzle 70 are well known in the art and come in many configurations. Thus the foregoing description is exemplary in nature and it is expected that alternate, lobed, mixer nozzle configurations would perform equally as well.

Figure 3:
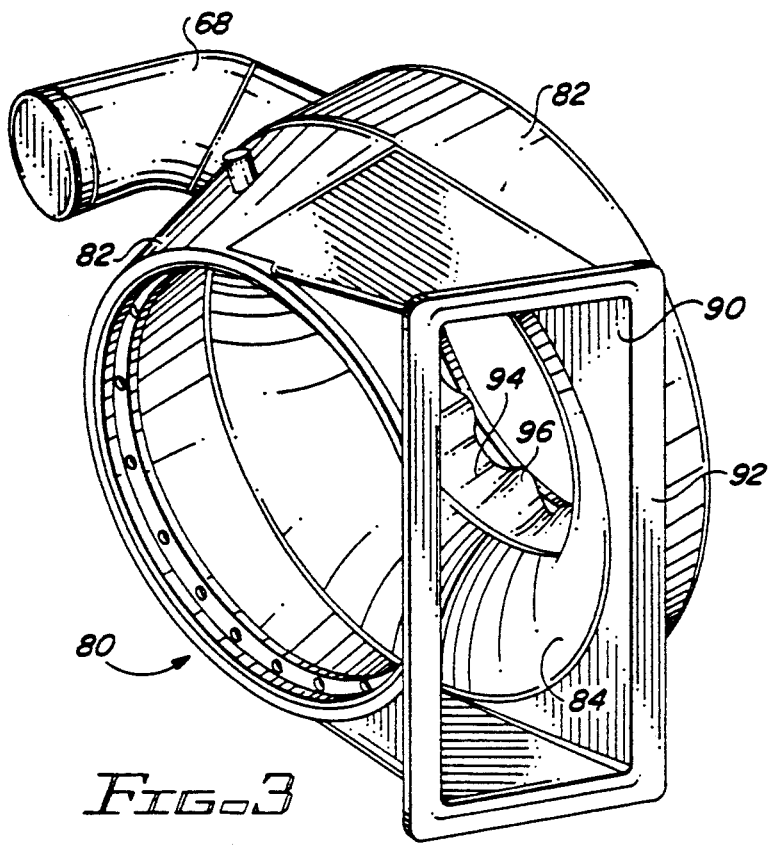
FIG. 3 is a perspective view of the eductor housing related to the present invention.
Figure 4:
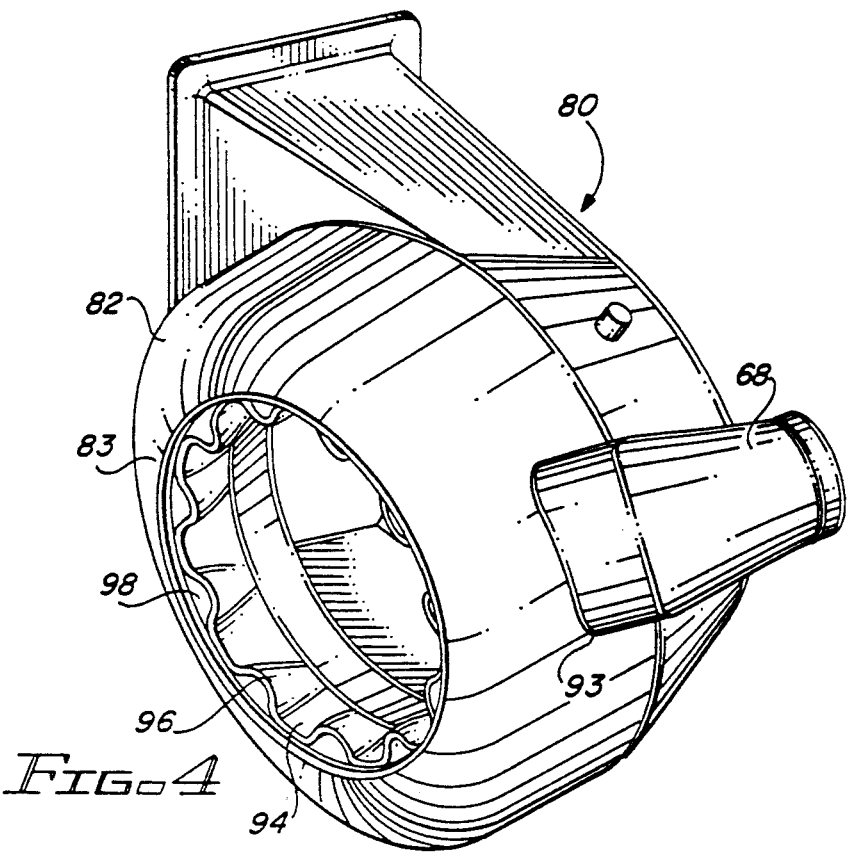
FIG. 4 is another perspective view of the eductor housing related to the present invention.
Figure 10:
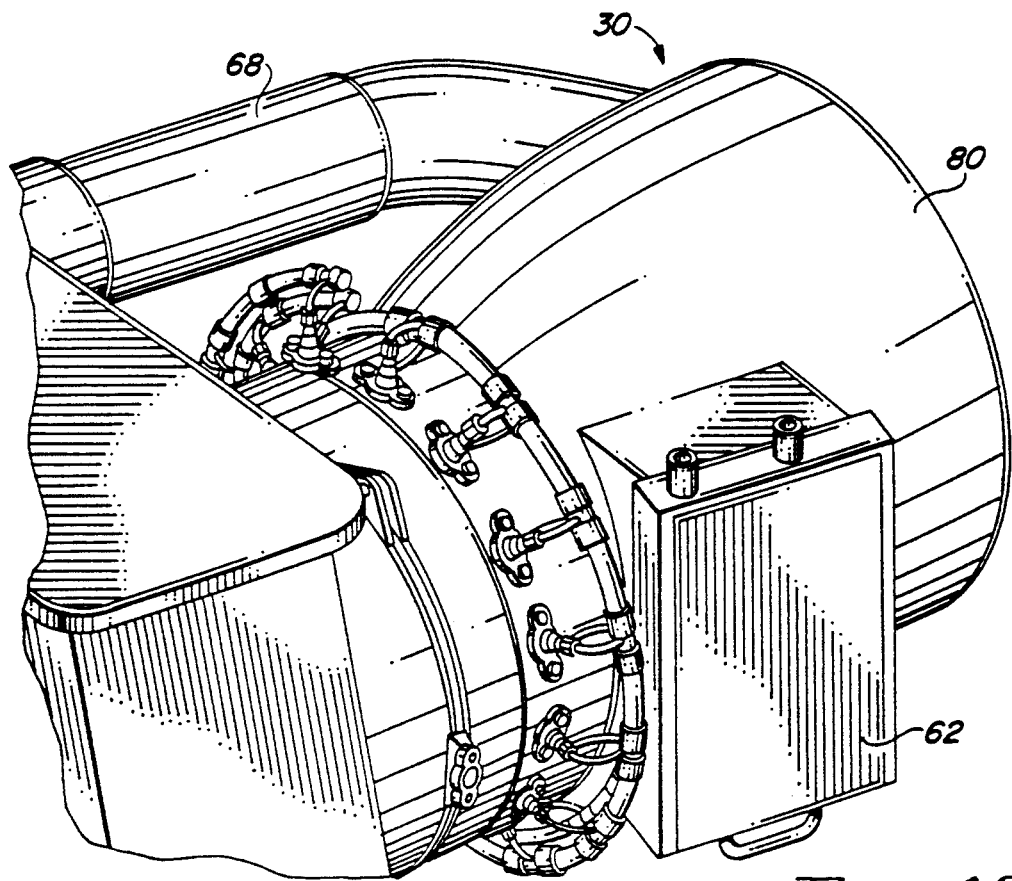
FIG. 10 is a perspective view of the auxiliary power unit of FIG. 1.

The eductor 60 also has an eductor housing 80, (see FIGS. 3, 4 and 10). The eductor housing 80 consists of an annular casing 82 open at both axial ends, and is mounted at one axial end to the flange member 78 and at its other axial end to the tailpipe 52. At the axial end adjacent the tailpipe 52, the casing 82 has an inwardly extending, annular endwall 83. A bellmouth shaped annular wall 84 extends radially inward from the inner surface of the casing 82 to define two separate plenums 86 and 88 and a nozzle 81 between the wall 84 and the mixer 72. The plenum 86 circumscribes the mixer 72. A rectangular opening 90 in the casing 82 places the plenum 86 in fluid communication with the compartment 12. The opening 90 is surrounded by a flange 92 to which the oil cooler 62 can be mounted. A second opening 93 to the casing 82 places the conduit 68 in communication with the plenum 88. Extending between the wall 84 and the endwall 83 is an axially extending, ring wall 94 that in combination with the inner portion of the bellmouth wall 84 defines a mixing duct 54 that extends axially from the discharge of the mixer nozzle 70 through the eductor housing and into the tailpipe 52. Cooling or venting air represented by arrows 58 flows from the plenum 86, through the nozzle 81 and channels 79, and then into the mixing duct 54. The plenum 88 circumscribes the ring wall 94 which has a plurality if circumferentially spaced holes or slots 98 each of which, in the preferred embodiment, opens into a scoop 96. The holes or slots 98 are depicted having a triangular shape, but instead may have any shape such as round or rectangular. The scoops 96 act to turn the surge bleed flow, represented by arrows 56, so that the bleed flow 56 exiting the scoops 96 enters the mixing duct 54 essentially parallel to the centerline 18 of the APU 30 and flowing towards the tailpipe 52. This turning of the surge bleed flow 56 also quiets it. Importantly, by injecting the surge bleed 56 into the mixing duct 54 the entraining of the the cooling or venting flow 58 is enhanced.

Figure 7:
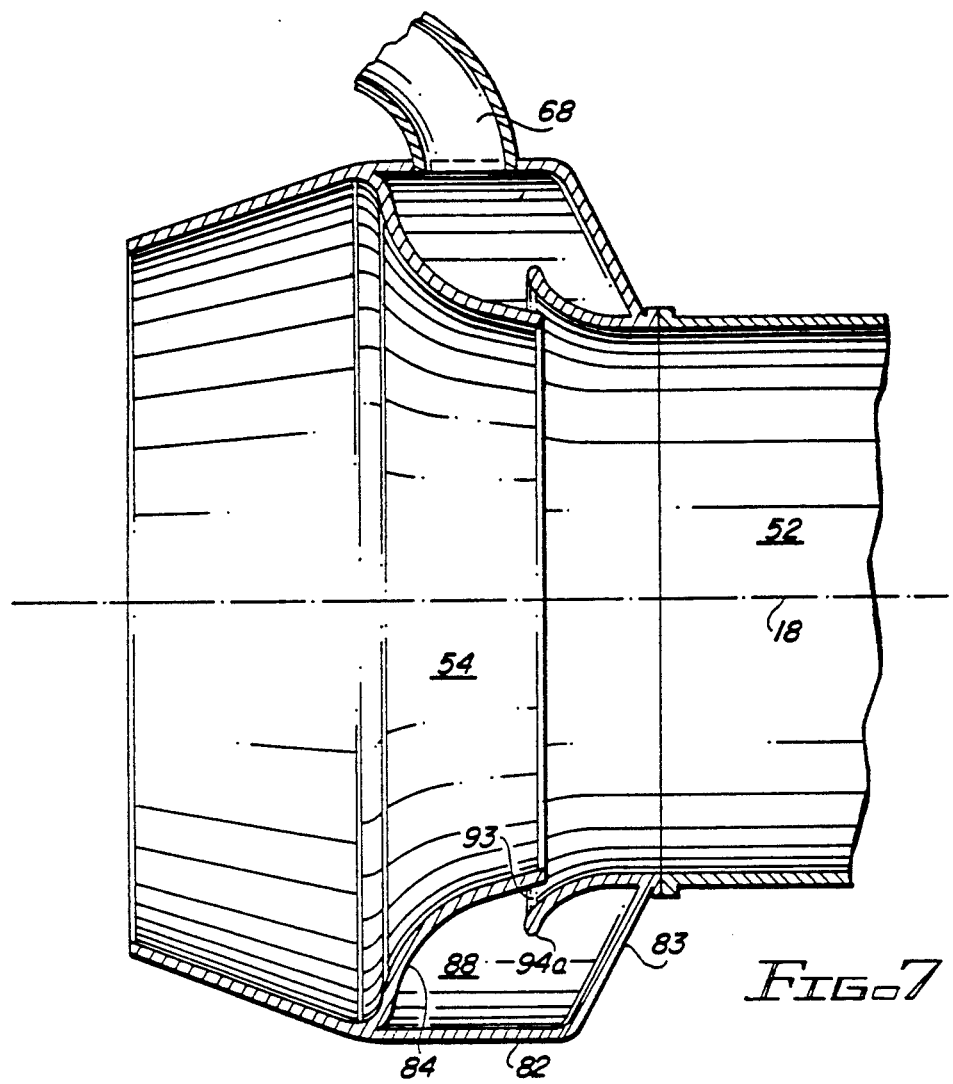
FIG. 7 is a perspective view of an alternate embodiment of the ring wall of FIG. 5.
Figure 8:
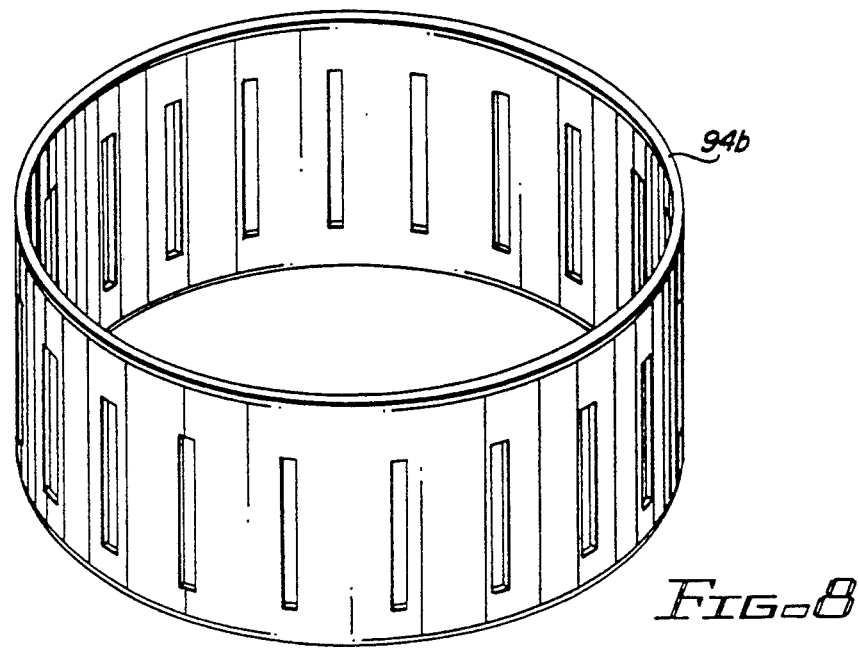
FIG. 8 is a perspective view of an alternate embodiment of the ring wall of FIG. 5.
Figure 9:
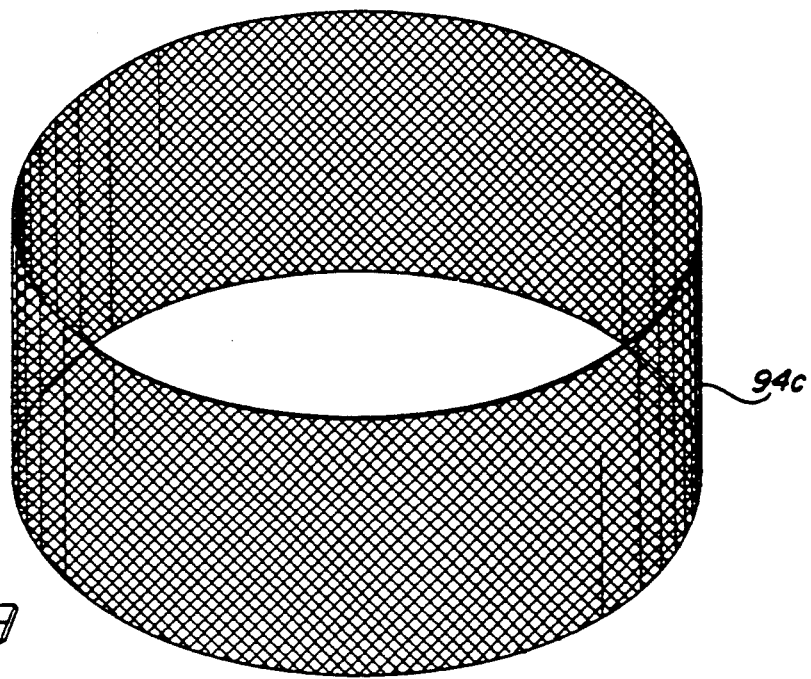
FIG. 9 is a perspective view of another alternate embodiment of the ring wall of FIG. 5.

Alternate configurations of the ring wall 94 are also contemplated by the present invention. For example, a bellmouth shaped ring wall 94a, as shown in FIG. 7, having its larger diameter end circumscribing a portion of the smaller diameter end of the bellmouth wall 84 to define and annular gap 93 for passing the surge bleed 56 from the plenum 88 to the mixing duct 54. For support a plurality of circumferentially space struts, not shown, may be disposed between the bellmouth ring wall 94a and the bellmouth wall 84. Alternatively, a perforated ring wall can be provided.

During the operation of the APU 30, a stream of high velocity gas represented by arrows 48 flows from the turbine section 40, through the mixer 70 and into the mixing duct 54. In the mixing duct 54 the kinetic energy of the gas 48 is transferred to the slower cooling flow 58. Resulting in a drop of static pressure downstream of the nozzle 81 which creates a suction entraining cooling flow 58 for the plenum 86 and the compartment 12.

Further, if the surge conduit 68 is opened then the surge bleed flow 56 passes through the ring wall 94 into the mixing duct 54 creating an additional suction which enhances the eductors performance without substantially backpressuring the engine 30.

From the foregoing it is apparent that the present invention also provides an improved method of producing cooling or ventilating flow for an APU mounted in a compartment by efficiently mixing the APU's exhaust gas with the cooling stream by use of a mixer nozzle and enhancing the entrainment of the cooling flow by injecting the surge bleed flow downstream of the mixer. The surge bleed flow is turned so that it enters the mixing duct essentially parallel to the flow in the mixing duct.

Various modifications and alterations to the above described preferred embodiment will be apparent to those skilled in the art. Accordingly, this description of the invention should be considered exemplary in nature and not as limiting to the scope and spirit of the invention as set forth in the following claims.

What is claimed is:

1. A method for cooling the heat generated by a gas turbine engine having an oil cooler mounted in an compartment comprising the steps of:
   mounting a mixer nozzle downstream of said engine for receiving the high velocity gas exiting therefrom;
   collecting the heated air in said compartment in a plenum circumscribing said mixer nozzle;
   mounting a second nozzle about said mixer nozzle and downstream of said plenum;
   entraining air from said compartment, through said plenum and second nozzle by mixing the high velocity gas exiting said mixer nozzle with the slower air flow exiting said second nozzle; and
   passing said entrained air across said engine's oil cooler.

2. The method of claim 1 further including the steps of:
   receiving a flow of high velocity air from said engine; and
   injecting said high velocity air into the mixture of air and gas downstream of said mixer nozzle and second nozzles to enhance said entrainment.

3. The method of claim 2 wherein said step of injecting includes turning said high velocity air so that it flows parallel with the mixed air and gas.

4. An eductor comprising an annular mixer nozzle receiving a flow of high velocity gas, and mounted within a housing defining a first, annular plenum circumscribing said mixer nozzle, said plenum having an inlet for receiving venting air from the environment surrounding said eductor, said housing also defining a second nozzle receiving said venting air from said plenum, said second nozzle also circumscribing said mixer nozzle, said venting air having a velocity substantially less than said gas, and a mixing duct downstream of said mixer and second nozzles for receiving and mixing their respective discharge flows, and means for injecting a stream of high pressure gas into said mixing duct downstream of said mixer and second nozzles.

5. The eductor of claim 4 further including an oil cooler transversely mounted across said inlet to said plenum.

6. The eductor of claim 4 further comprising a plug mounted within said mixer nozzle to define an annular flow path therebetween, said annular flow path receiving said high velocity gas.

7. The eductor of claim 1 wherein said housing defines a second, annular plenum downstream of said first annular plenum and circumscribing said mixing duct, said second plenum having an inlet for receiving a flow of high velocity air, said housing including a first bellmouth shaped wall and a second bellmouth shaped wall circumscribing a portion of said first bellmouth shaped wall to define an annular passage therebetween, said bellmouth shaped walls disposed between said second plenum and said mixing duct so that said high velocity air in said second plenum flows through said annular passage into said mixing duct.

8. An eductor comprising an annular mixer nozzle receiving a flow of high velocity gas, and mounted within a housing defining a first, annular plenum circumscribing said mixer nozzle, said plenum having an inlet for receiving venting air from the environment surrounding said eductor, said housing also defining a second nozzle receiving said venting air from said plenum, said second nozzle also circumscribing said mixer nozzle, said venting air having a velocity substantially less than said gas, and a mixing duct downstream of said mixer and second nozzles for receiving and mixing their respective discharge flows, said housing further defining a second, annular plenum downstream of said first annular plenum and circumscribing said mixing duct, said second plenum having an inlet for receiving a flow of high velocity air, said housing including a ring wall, disposed between said second plenum and mixing duct, said ring wall having a plurality of holes for passing said high velocity air from said second plenum into said mixing duct.

9. The eductor of claim 8 wherein said holes are circumferentially spaced, each of said holes opening into a scoop extending radially inward from the inner surface of said ring wall, said scoop turning the flow of said high velocity air so that when said air enters said mixing duct it is flowing in substantially the same direction as the flow of mixed gas and air in the mixing duct.

10. The eductor of claim 8 wherein said holes are circumferentially spaced rectangular slots.

11. The eductor of claim 8 wherein said ring wall is perforated and is circumscribed by a wire screen mounted thereto.

12. In combination with a gas turbine engine developing a high velocity gas flow therefrom, and mounted in an air filled compartment, said compartment having a tail pipe for exhausting said gas and air from said compartment:
   a mixer nozzle mounted to said engine for receiving said high velocity gas;
   an annular casing radially spaced outward from said mixer nozzle and disposed between said engine and said tail pipe to define an annular plenum circumscribing said mixer nozzle; said casing having an inlet opening into said plenum for receiving air from said compartment;
   a bellmouth shaped wall extending radially inward from the interior surface of said casing to define a nozzle for generating a stream of air from said plenum, said nozzle disposed between said wall and said mixer nozzle, said wall coupling with said tail pipe to define a mixing duct downstream of said mixer nozzle;
   a plug extending axially from said engine and centrally disposed within said mixer nozzle to define an annular flow path between said mixer nozzle and said plug; and an oil cooler mounted to the exterior surface of said casing so as to traverse said casing inlet.

13. In combination with a gas turbine engine developing both a high velocity gas and air flow therefrom, and mounted in an air filled compartment, said compartment having a tail pipe for exhausting said gas and air from said engine:

a mixer nozzle mounted to said engine for receiving said high velocity gas;

an annular casing radially spaced outward from said mixer nozzle and disposed between said engine and said tail pipe to define a first annular plenum circumscribing said mixer nozzle; said casing having a first inlet opening into said plenum for receiving air from said compartment;

a bellmouth shaped wall extending radially inward from the interior surface of said casing to define a nozzle for generating a stream of air from said first plenum, said nozzle disposed between said wall and said mixer nozzle, said bellmouth wall also defining a second plenum adjacent said first plenum and having a second inlet for receiving a flow of high velocity air; and a ring wall extending from the inner end of said bellmouth wall to said tail pipe to define a mixing duct downstream of said mixer nozzle, said ring wall separating said second plenum from said mixing duct, said ring wall having means for passing said high velocity air from said second plenum into said mixing duct.

14. A combination as set forth in claim 13 wherein said ring wall has a plurality of circumferentially spaced holes.

15. A combination as set forth in claim 14 wherein each of said holes opens into a scoop extending radially inward from the inner surface of said ring wall.

16. A combination as set forth in claim 15 wherein each of said scoops turns said high velocity air so that when it enters said mixing duct it is flowing in substantially the same direction as the flow of the gas and air therein.

17. A combination as set forth in claim 14 wherein said holes are rectangular slots.

18. A combination as set forth in claim 13 wherein said ring wall is perforated.

19. A combination as set forth in claim 13 wherein said ring wall is bellmouth shaped and and circumscribes a portion of said bellmouth shaped wall to define an annular passage through which said high velocity air flows from said second plenum to said mixing duct.

20. A combination as set forth in claim 13 further including a plug extending axially from said engine and centrally disposed within said mixer nozzle to define an annular flow path between said mixer nozzle and said plug.

21. A combination as set forth in claim 13 further including an oil cooler mounted to the exterior surface of said casing so as to traverse said casing inlet.

* * * * *

UNITED STATES PATENT AND TRADEMARK OFFICE
CERTIFICATE OF CORRECTION

PATENT NO. : 5,265,408
DATED : November 30, 1993
INVENTOR(S) : Sheoran et al

It is certified that error appears in the above-identified patent and that said Letters Patent is hereby corrected as shown below:

Col. 5, lines 60 and 63, and col. 6, line 25 before "second" insert --said--. and change "nozzles" to --nozzle--.

Signed and Sealed this

Second Day of August, 1994

*Attest:*

BRUCE LEHMAN

*Attesting Officer*      *Commissioner of Patents and Trademarks*